United States Patent [19]

Yeomans

[11] Patent Number: 5,195,597
[45] Date of Patent: Mar. 23, 1993

[54] SHEAR PIN ASSEMBLY

[76] Inventor: Allan J. Yeomans, 60 Sunrise Blvd., Surfers Paradise, Gold Coast City, Queensland 4217, Australia

[21] Appl. No.: 829,487

[22] Filed: Feb. 3, 1992

[51] Int. Cl.$^5$ .............................................. A01B 61/04
[52] U.S. Cl. ........................................ 172/271; 403/2; 172/763
[58] Field of Search ............... 172/271, 261, 763, 681, 172/773; 403/2

[56] References Cited

U.S. PATENT DOCUMENTS

| 3,425,755 | 2/1969 | Harris | 172/763 |
|---|---|---|---|
| 4,585,073 | 4/1986 | Mayeda et al. | 172/271 |
| 4,786,204 | 11/1988 | Mayeda | 172/763 |
| 4,842,077 | 6/1989 | Peterson, Jr. et al. | 172/763 |
| 5,040,616 | 8/1991 | Hake | 172/271 |

FOREIGN PATENT DOCUMENTS

| 3141920 | 5/1983 | Fed. Rep. of Germany | 172/271 |
|---|---|---|---|
| 3325911 | 1/1985 | Fed. Rep. of Germany | 172/763 |
| 2033192 | 5/1980 | United Kingdom | 172/271 |

Primary Examiner—Randolph A. Reese
Assistant Examiner—Spencer Warnick
Attorney, Agent, or Firm—Wood, Phillips, VanSanten, Hoffman & Ertel

[57] ABSTRACT

A soil penetrating tool assembly for mounting to a tool bar of a soil penetrating implement including a shank member which has an elongate body, a soil penetrating tool which is located on the first end of the body and a facing plate located on a second end of the body. The facing plate engages one side of the tool bar, and has a first end and a second end which has an opening. A clamping plate engages the other side of the tool bar, and has a first end and a forked second end which has two prongs each having openings including two sections, generally oblong in cross-section, offset from one another with different centerlines. The facing plate first end and clamping plate first end include facing flanges each having a through hole and a bolt secures the flanges together with a clearance therebetween. The opening sections in each of the clamping plate prongs and the facing plate opening define a generally cylindrical passage therethrough with a selected diameter when the shank member is mounted to the tool bar, and a shear pin extends through that defined passage.

14 Claims, 4 Drawing Sheets

SHEAR PIN ASSEMBLY

TECHNICAL FIELD

The present invention relates to a shank or tine mounting assembly for the attachment of earth working shanks or tines to cultivator frames or tool bars.

BACKGROUND ART

Seedbeds for agriculture and foundations for construction sites are typically prepared by forcing strong metal shanks or tines through the compacted soil. The shanks are mounted to a cultivator frame that is pulled by a tractor through a drawbar or mounted to a tool bar that is attached to a tractor by means of a three point hitch.

It has been common for the attachment of the shanks to the frames to be such that the shanks can be shifted laterally to permit mounting at different lateral spacings between shanks. It has also been common for the shanks to be releasably mounted to prevent damage to the shanks, frame, tool bar, and/or the shank carrying implement when an obstruction is encountered in the soil.

Typically, shanks have also been mounted in such a manner that the shank (and in particular its actual ground engaging point) vibrate so as to reduce drag through the soil and also to produce better fracturing of the soil being cultivated. Therefore, the shank has usually been rigidly attached to the frame so as to inhibit the dampening of vibrations from the tractor and those generated by the tilling process.

Various structures have been used to attach shanks to a cultivating frame. One common configuration has been the use of a clamping member with an upper end clamped or bolted to the frame, where a shank member is secured in a yoke in the clamping member lower end by a suitable mounting pin or bolt and a suitable shear pin extending through two sets of aligned holes in the yoke and shank member. However, because of the inherent clearance between the bolt and the respective holes in the yoke and the shank member, this structure does not form a rigid attachment to the frame member, and therefore the vibrations transmitted to the ground working point of the shank are undesirably dampened. Further, the pins also require some form of restraint to prevent them from working out of position in use. Still further, since shear pins tend to bend and distort during the shearing process and when the shearing action is completed, the sheared portion of the shear pin is often difficult to remove from the holes in the yoke and the shank member. In order to reduce this difficulty in removing the distorted shear pin components, shear pins sometimes have had grooves machined into them at the point where shearing is desired to occur. However, such machining adds to the cost of the shear pin and, since the size of the radii of such grooves is critical to the force required to shear the pins (the smaller the radii the lower the shear force required), the unavoidable variation in the radii of such grooves reduces the predictability of the required clearing force (that is, such grooved shear pins have undesirably unpredictable failure).

Another common configuration has been to rigidly attach the shank directly to the frame of the implement or the tool bar by positioning the shank against the frame and then bolting a clamp member to the shank and about the frame, whereby the bolts will thereafter fail in tension should an obstruction be encountered. In one variation of that structure, the nuts attached to the bolts are of softer material so that, when an obstruction is encountered by the shank, it is the nut which fails (by stripping the internal thread of the nut) and thus the bolt is not damaged and may be reused. This configuration does generally tend to rigidly connect the frame and shank so as to transfer vibrations through to the ground working point as desired. However, refitting new bolts or nuts in a farm field after each failure occurs is often difficult and time consuming for a number of reasons. First, the soft nut material may smear into the threads of the reused bolt so that threading a new nut on the reused bolt can be difficult. Second, the torque to be applied to the nut during reinstallation of the shank member must be sufficient to adequately secure the shank member but not too great to cause stripping of the soft nut or failure of a soft bolt. Of course, obtaining this proper torque is particularly difficult if smeared metal remains on the reused bolt.

It is the object of the present invention to overcome and substantially ameliorate the above-described disadvantages and to enhance the usefulness of such systems in the field.

SUMMARY OF THE INVENTION

In one aspect of the present invention, a soil penetrating tool assembly for mounting to a tool bar of a soil penetrating implement is provided including a shank member which has an elongate body, a soil penetrating tool which is located on the first end of the body and a facing plate located on a second end of the body. The facing plate engages one side of the tool bar, and has a first end and a second end which has an opening with a selected transverse dimension. A clamping plate engages the other side of the tool bar, and has a first end and a second end which has an opening also with a selected transverse dimension. The facing plate first end and clamping plate first end are secured together, and a substantially cylindrical shear pin extends through the plate openings and has a selected diameter less than both of the selected transverse dimensions. The facing plate opening and the clamping plate opening include aligned portions defining a generally cylindrical passage therethrough with the selected diameter when the shank member is mounted to the tool bar with the shear pin extending through the passage.

In another aspect of the present invention, the clamping plate first end and the facing plate first end include facing flanges each having a through hole and a bolt secures the flanges together with a clearance therebetween so that upon failure of the shear pin the shank member and clamping plate may pivot about the bolt and clear of the tool bar to allow movement of the shank member about the tool bar.

In yet another aspect of the present invention, the clamping plate second end is forked with two prongs and the facing plate second end is disposed between the prongs. The clamping plate opening in both of the prongs includes two sections offset from one another with different center-lines, and the aligned portions of the opening sections in each of the prongs define the generally cylindrical passage.

In still another aspect of the present invention, the longitudinal openings are generally oblong in cross-section.

It is an object of the present invention to provide an inexpensive, reliable and easy to use tool assembly which is protected from damage should obstructions be encountered which stress the assembly a selected amount.

It is another object of the present invention to provide a tool assembly which efficiently transfers vibrations to the ground working point of the implement to minimize drag on the implement and maximize fracturing of the soil being cultivated.

It is still another object of the present invention to provide a tool assembly which can easily and reliably be reconnected to the tool bar after any failure of a shear pin resulting from encountering an obstruction.

It is yet another object of the present invention to provide a tool assembly in which, after failure of a shear pin, the assembly can be quickly and easily remounted to the tool bar by insertion of a new shear pin.

Still other aspects, objects, and advantages of the present invention can be obtained by a study of the drawings, the specification, and the appended claims.

DESCRIPTION OF THE PREFERRED EMBODIMENT

Figure 1:
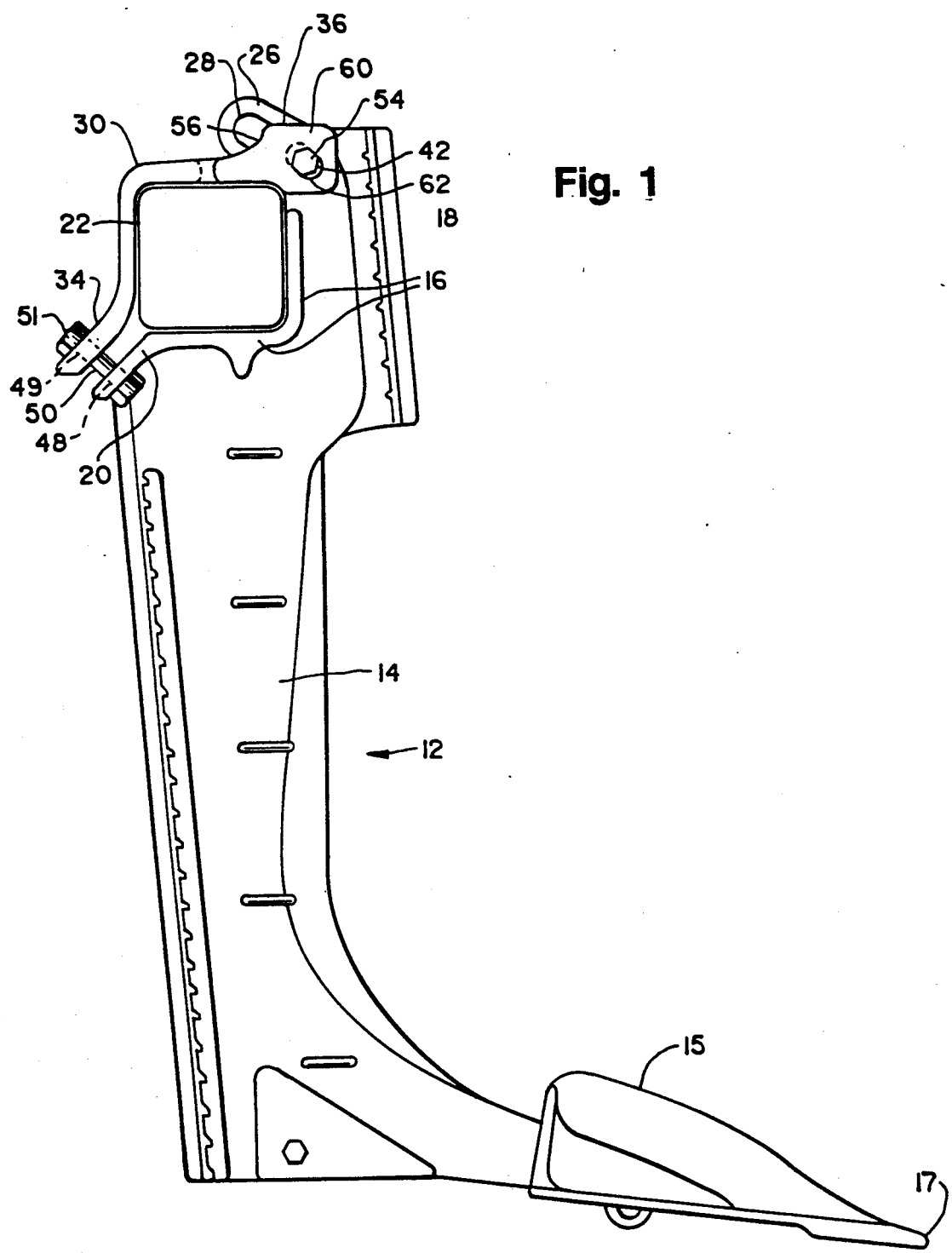
FIG. 1 is a side view of the tool assembly of the preferred embodiment as mounted to a tool bar.

An exemplary embodiment of a soil penetrating tool assembly 10 including the shear pin configuration of the present invention is shown generally in FIG. 1 in a fully assembled configuration.

The tool assembly includes a shank member 12 constructed of a durable material, such as cast or forged metals, preferably steel. The shank member 12 consists of an elongate body 14, a soil penetrating tool 15 located at the lower end of the elongate body 14, and an upwardly and rearwardly facing plate 16 located on the upper end of the elongate body 14.

The elongate body 14 and the soil penetrating tool 15 can be of any suitable configuration, including standard configurations presently widely used and well established in the industry. The leading edge of the soil penetrating tool 15 has a pointed edge 17 to ease in the penetration of the soil.

The facing plate 16 is slightly wider (when viewed from the line of the direction of travel of the assembly) than the shank member 12 and has an upright lug 18 extending beyond one end. The facing plate 16 also includes a flange 20 rearward of the lug 18 and angled downwardly from the upwardly facing plate 16.

The facing plate 16 is directly mounted to a suitable tool bar or cross bar 22 of a cultivator as described further hereafter. Although the cross bar 22 may be of any configuration which is not cylindrical in cross-section, typically cross bars have a generally square cross-section such as shown in FIGS. 1 and 2.

Figure 2:
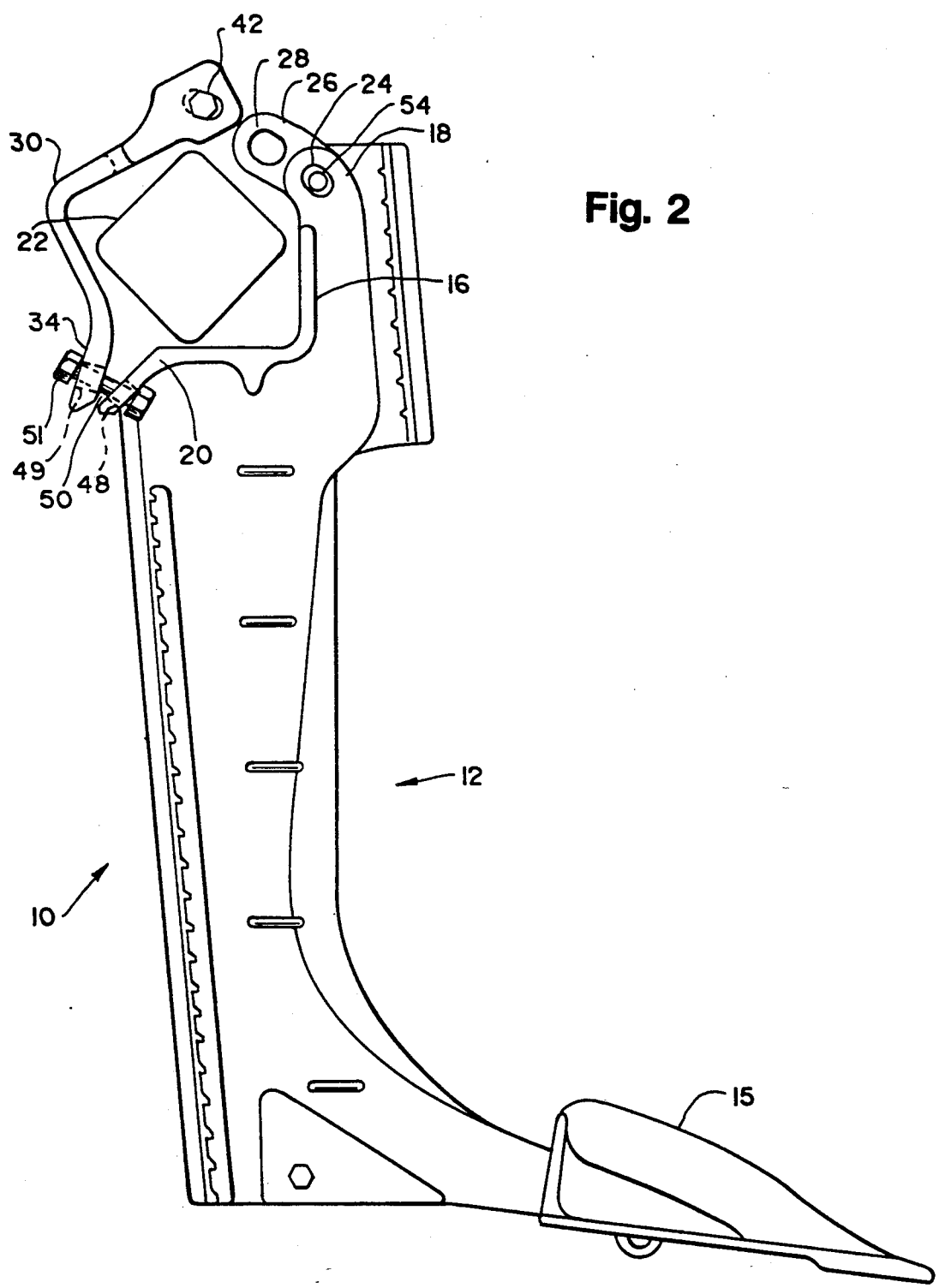
FIG. 2 is a side view similar to FIG. 1, but showing the assembly following failure of a shear pin.
Figure 3:
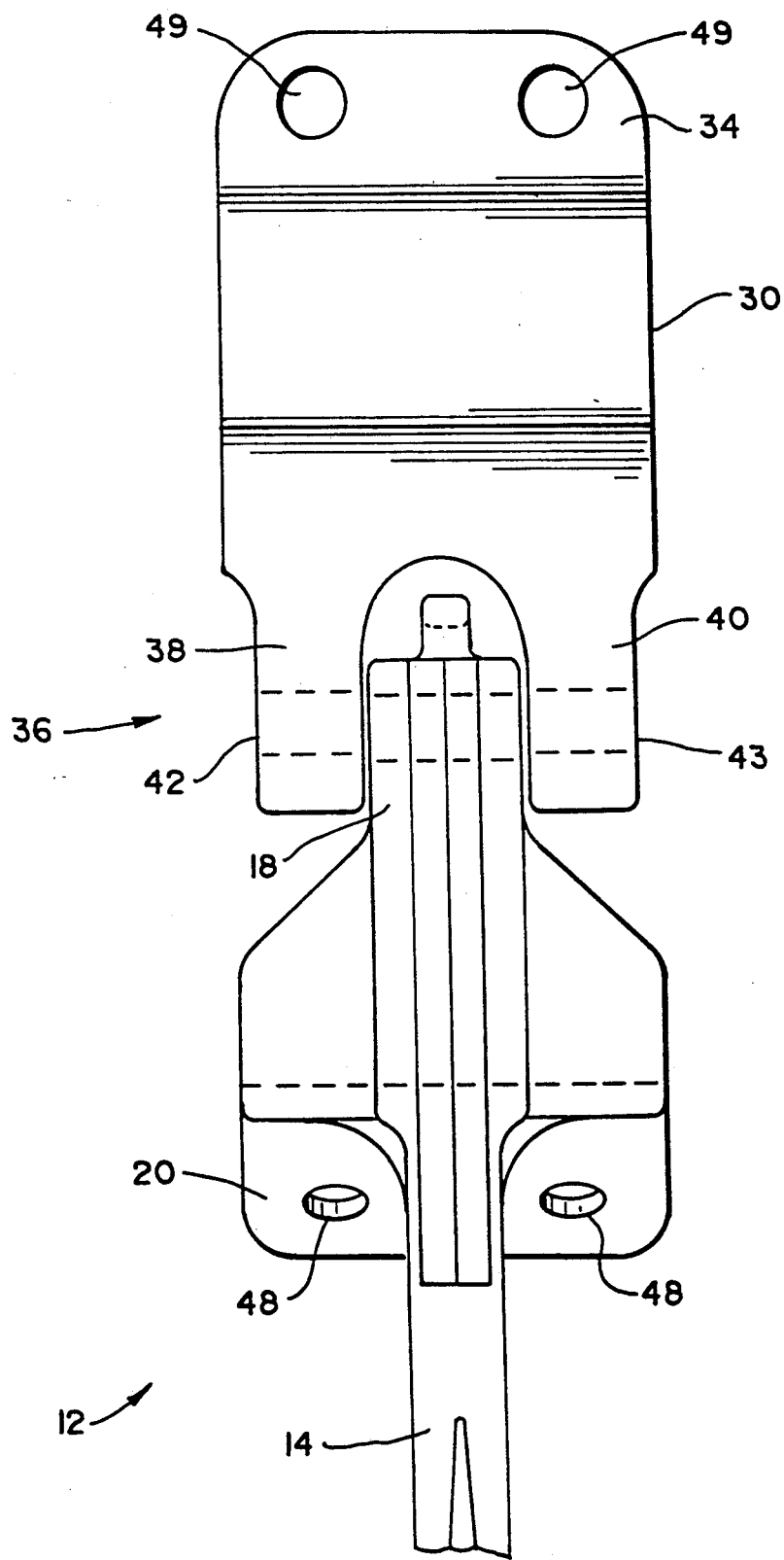
FIG. 3 is a view of the clamping plate and shank assembly in a fully opened position by the removal of the attachment bolts, for illustration.
Figure 4:
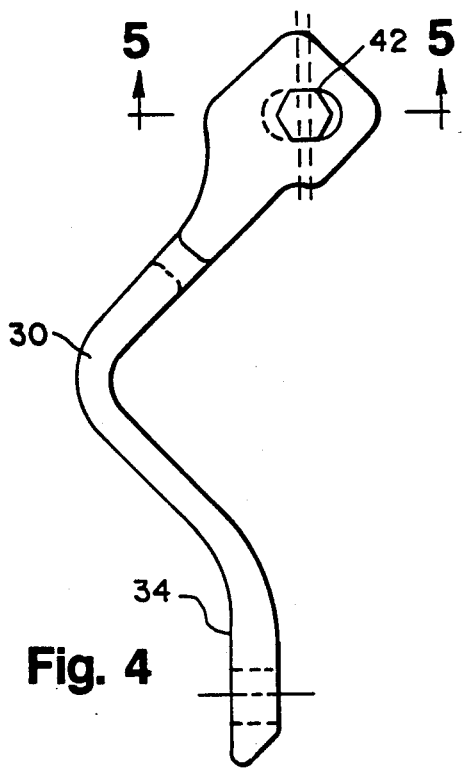
FIG. 4 is a side elevation of the clamping plate.
Figure 5:
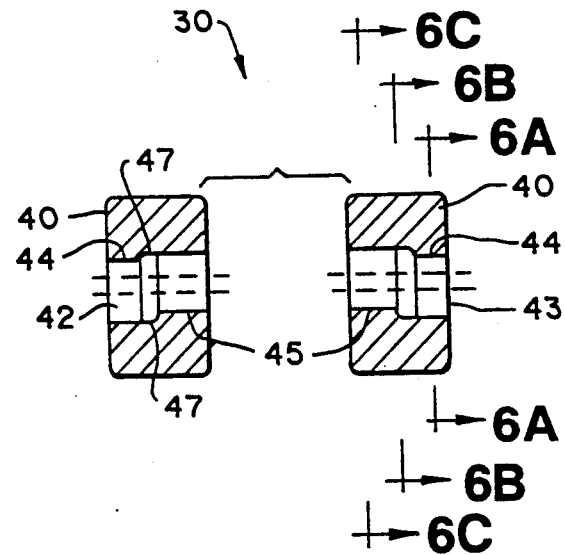
FIG. 5 is a cross-sectional view taken along line 5—5 of FIG. 4, showing of the openings through the prongs of the clamping plate.
Figures 6A, 6B, 6C:
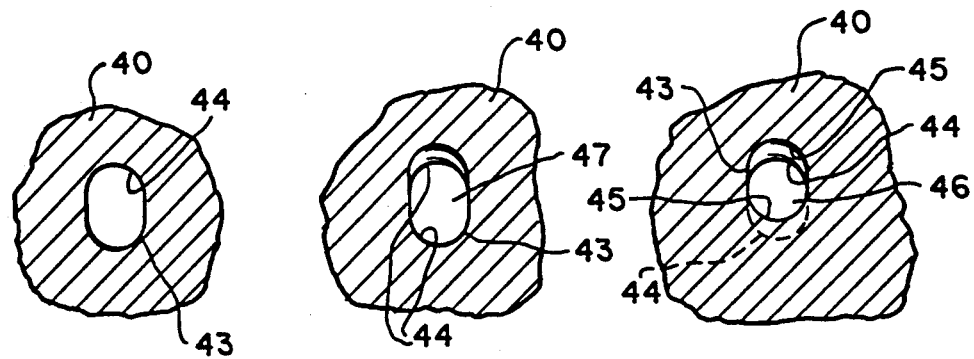
FIG. 6A is a cross-sectional view taken along line A—A of FIG. 5.
FIG. 6B is a cross-sectional view taken along line B—B of FIG. 5.
FIG. 6C is a cross-sectional view taken along line C—C of FIG. 5.

The lug 18 includes a through hole 24 which is generally oblong in cross-section and parallel to the cross bar 22 as shown in FIG. 2. A ear 26 extends upward and rearward from the hole 24 of the lug 18. This ear 26 has an opening 28 through which a tool such as a punch or crow bar (not shown) can be inserted to assist in the assembly of the soil penetrating tool assembly 10.

An L-shaped clamping plate 30 is provided with a flanged end 34 and a forked end 36 having two prongs 38 and 40, each having oblong shaped holes or openings 42, 43 therethrough. As best shown in FIGS. 5 and 6A-C, each of the prong openings include two sections 44, 45 which are each generally oblong in cross-section, and which are offset from one another so that the overlapping portions of the sections 44, 45 define a generally cylindrical passage 46 therethrough with a selected diameter (see FIG. 6C). A transitional section 47 of the opening is also preferably included between the two opening sections 44, 45 of each prong 38, 40 so that there is no location at which the openings 42, 43 are actually as small as the defined cylindrical passage 46.

Two holes 49 located in the flanged end 34 of the clamping plate 30 are aligned with two holes 48 in the lower rear portion of the flange 20 of the shank member 12 when the soil penetrating tool assembly 10 is supported on the cross bar 22 with the facing plate 16 contacting the bottom and the front of the cross bar 22 and the clamping plate 30 contacting the top and back of the cross bar 22. Bolts 50 and nuts 51 are disposed in the aligned holes 48, 49 to secure the clamping plate flanged end 34 and the facing plate flange 20 together in a spaced apart relation when the cross bar 22 is enclosed between the clamping plate 30 and shank member facing plate 16 as shown in FIG. 1.

When the assembly 10 is properly mounted to the cross bar 22, the clamping plate prong openings 42, 43 and the shank member lug through hole 24 are aligned with a shear pin 54 extending therethrough. The shear pin 54 is preferably substantially cylindrical with a diameter small enough to fit easily but snugly through the defined cylindrical passage 46 (see FIG. 6C), and the oblong lug through hole 24 is located so that its one side which engages the shear pin 54 (as should be apparent) during mounting will, in combination with the bolts 50 and nuts 51, function to secure the clamp plate 30 and the facing plate together and against the cross bar 22. Such direct contact with the cross bar 22 not only restrains movement of the shank member 12 to maintain the desired orientation, but it also acts to directly pass vibrations in the cross bar 22 through to the shank member 12 for preferred operation in which the vibrations help to smoothly work the soil penetrating tool through the soil as previously discussed. That is, this rigid mounting minimizes any dampening effect in the connection to assure that the vibrations generated in the tilling process remain at the shank of the tool in order to provide vibrations to assist in the tilling process. The presence of these vibrations improve the crumbling of the soil and also reduce the power necessary to move the soil penetrating tool through the soil.

Referring now to FIG. 2, in the event that the soil penetrating tool assembly 10 hits an obstruction such as a rock, rather than damage the cross bar 22 or other components of the implement, the shear pin 54 will shear to free the shank member lug 18 from the clamping plate 30. Due to the spacing of the clamping plate flanged end 34 from the facing plate flange 20, as well as the enlarged size of the holes 48, 49 relative to the bolts 50, the clamping plate 30 and facing plate flange 20 will pivot relative to one another as shown in FIG. 2 (without damaging the bolts 50) sufficiently so that the shank member 12 may pivot about the cross bar 22 until it is clear of the obstruction. Further, the tool assembly 10 will, even after failure of the shear pin 54, typically remain connected to the cross bar 22 such as shown in FIG. 2. Therefore, trailing components of the implement will not risk damage by running over a disconnected shank member 12 and, of course, an operator will not have to walk through the field hunting for the soil penetrating tool and/or for the clamping plate 20 in such instances.

Once an understanding of the above described invention is had, it should be recognized that while the shear pin 54 will be securely held in place during normal operation, if the pin 54 is sheared the pieces which remain after failure will not be restrained (because each piece will not be in any two of the holes 24, 42, 43 and each of those holes are larger than the cross-sectional size of the pin 54). Therefore, the pieces of the pin 54 will not be wedged in as can occur with conventional structures, and thus remounting of the tool assembly 10 can be easily accomplished without having to pry distorted remnants of the pin 54 from any of the holes 24, 42, 43.

That is, after the remnants of the shear pin 54 are removed, the tool assembly 10 may be firmly reattached to the tool cross bar 22 by simply realigning the holes 24, 42, 43 (for example, by inserting a suitable tool in the ear opening 28 as leverage for pushing against the shoulder 56 on the clamping plate 30 [see FIG. 1]), and then a new shear pin 54 may be inserted, typically by a simple hammer blow). This feature permits an individual operator to make the shear pin 54 replacement without assistance from another individual.

If necessary or to ease in mounting, the bolts 50 and nuts 51 can be loosened or tightened to ensure a secure mounting which will properly transmit vibrations as previously discussed. However, it is typically not necessary to re-adjust the position of the nuts 51 on the bolts 50 each time a failed shear pin is replaced.

Typically, frictional forces will be sufficient to maintain a shear pin 54 within the holes 24, 42, 43 when it functions to hold the clamping plate 30 and shank assembly lug 18 together and the attaching bolts 50 are suitably tightened, and therefore no additional restraining means should be required. If desired as a security measure, however, any suitable such means could be used.

Further, it should be understood by those skilled in this art that the above configuration does not require any diameter reduction or other forms of necking at the shear points in the shear pin 54 as is required in some prior art to minimize distortion. Accordingly, shear pins 54 having a generally smaller cross-sectional area can be utilized with the present invention, and such simple shear pins 54 are both inexpensive and provide a more consistent and reliably determinable force required for shear failure.

In summary, soil penetrating tool assemblies embodying the present invention provide maximum reliability and ease of use at minimum cost.

Still other aspects, objects and advantages of the present invention can be obtained from a study of the specification, the drawings, and the appended claims.

I claim:

1. A soil penetrating tool assembly for mounting to a tool bar of a soil penetrating implement, comprising:
   a shank member having an elongate body, a soil penetrating tool located on a first end of said body, and a facing plate located on a second end of said body, said facing plate engaging one side of said tool bar when mounted to said tool bar, said facing plate having a first end and a second end, said facing plate second end having a facing plate transverse opening with a first selected dimension;
   a clamping plate engaging another side of the tool bar when mounted thereto, said clamping plate having a first end and a second end, said clamping plate second end having a clamping plate transverse opening with a second selected dimension;
   means for securing said facing plate first end to said clamping plate first end, and;
   a substantially cylindrical shear pin extending through said facing plate opening and said clamping plate opening and having a selected diameter less than both said first and second selected transverse dimensions of said plate openings;
   wherein said facing plate opening and said clamping plate opening include aligned portions defining a generally cylindrical passage therethrough with the selected diameter when said shank member is mounted to said tool bar with the shear pin extending through said passage.

2. The assembly of claim 1, wherein said clamping plate first end and said facing plate first end include facing flanges each having a through hole, and said securing means is a bolt extending through said through holes.

3. The assembly of claim 2, wherein a clearance between said facing plate first end and said clamping plate first end is maintained when said ends are secured together whereby upon failure of said shear pin said shank member and clamping plate may pivot about the bolt and clear of to allow movement of the shank member about the tool bar.

4. The assembly of claim 1, wherein said shear pin is smaller than both said clamping plate opening and said facing plate opening and is snugly fit against at least one side of both the clamping plate opening and the facing plate opening when said shank member is mounted to said tool bar with the shear pin extending through said passage.

5. The assembly of claim 1, wherein said clamping plate second end is a fork with two prongs and said facing plate second end is disposed between said prongs, and said clamping plate opening extends through both of said prongs.

6. The assembly of claim 5, whereby the clamping plate opening in each of said prongs includes two sections offset from one another with different centerlines, and the aligned portions of said opening sections in each of said prongs define the generally cylindrical passage.

7. The assembly of claim 1, wherein said shank member is rigidly secured to said tool bar whereby vibrations in said bar are transmitted to said shank member.

8. The assembly of claim 1, wherein the openings are oblong in cross-section.

9. A soil penetrating tool assembly for mounting to a tool bar of a soil penetrating implement comprising:
   a shank member having an elongate body, a soil penetrating tool located on a first end of said body, and a facing plate located on a second end of said body, said facing plate engaging one side of said tool bar when mounted to said tool bar, said facing plate having a first end and a second end, said facing plate second end having a facing plate transverse opening with a first selected dimension;

a clamping plate engaging another side of the tool bar when mounted thereto, said clamping plate having a first end and a second end, said clamping plate second end being forked with two prongs with said facing plate second end disposed between said prongs;

an transversal opening through each of said clamping plate prongs, each of said openings having two sections offset from one another with different centerlines and with portions of each of said sections being aligned to define a generally cylindrical passage therethrough having a selected diameter;

means for securing said facing plate first end to said clamping plate first end, and;

a substantially cylindrical shear pin having a diameter slightly less than the selected diameter and extending through the defined passage in the clamping plate openings and through the facing plate opening when said shank member is mounted to said tool bar.

10. The assembly of claim 9, wherein said clamping plate first end and said facing plate first end include facing flanges each having a through hole, and said securing means is a bolt extending through said through holes.

11. The assembly of claim 10, wherein a clearance between said facing plate first end and said clamping plate first end is maintained when said ends are secured together whereby upon failure of said shear pin said shank member and clamping plate may pivot about the bolt and to allow movement of the shank member about the tool bar.

12. The assembly of claim 9, wherein said shear pin is snugly fit against at least one side of the facing plate opening and at least one side of each section of the clamping plate openings when said shank member is mounted to said tool bar with the shear pin extending through said passage.

13. The assembly of claim 9, wherein said shank member is rigidly secured to said tool bar whereby vibrations in said bar are transmitted to said shank member.

14. The assembly of claim 9, wherein the sections of the clamping plate openings are generally oblong in cross-section.

* * * * *